W. J. GAGNON.
BEAD CHAIN.
APPLICATION FILED OCT. 18, 1916.
1,270,143.
Patented June 18, 1918.
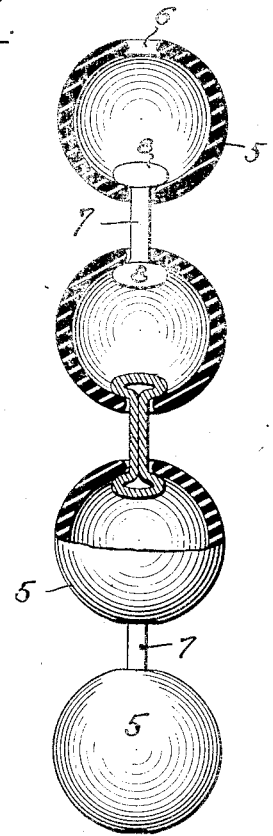
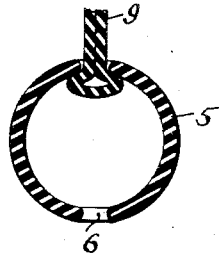
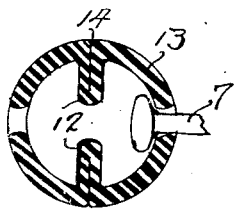
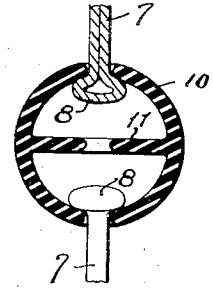
Inventor
William J. Gagnon

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

BEAD-CHAIN.

1,270,143.  Specification of Letters Patent.  Patented June 18, 1918.

Application filed October 18, 1916.  Serial No. 126,310.

*To all whom it may concern:*

Be it known that I, WILLIAM J. GAGNON, a citizen of the United States of America, and residing at Bridgeport, in the county of Fairfield and State of Connecticut, have invented a certain new and useful Improvement in Bead-Chains, of which the following is a specification.

My invention relates to bead-chains and particularly to a chain of the type shown in my prior Patent No. 1,078,494, November 11, 1913. The object of my invention is to provide a chain of this type which constitutes an insulated actuating member when used for operating electric switches or the like.

Referring to the accompanying drawings,

Figure 1 is an elevation partially in section through a chain in which my invention is embodied in one form;

Fig. 2 is a section through a modified construction;

Fig. 3 is a similar view of a further modification; and

Fig. 4 is a similar view of another modification.

The present chain comprises a series of hollow balls 5 with diametrically opposite holes 6 and united by intermediate links 7, provided at each end with heads 8 lying within the hollow balls and of greater diameter than the holes 6 which accommodate the shanks of the links. As heretofore constructed the chain elements have both been metallic and consequently the chain has constituted a conductor which it was necessary to carefully insulate from the mechanism of the electric switch which it was designed to operate.

According to my present invention one or both elements of the chain may be made of insulated material. In Fig. 1 the balls 5 are of insulating material and the intermediate links 7 are of metal. In Fig. 2 the links 9 as well as the balls 5 are of insulating material. In Fig. 3 the links 7 are of metal, as in Fig. 1, but the balls 10 are formed with an insulating diaphragm 11 which serves to space apart the heads 8 of the links when the chain becomes slack, thus preventing possible contact and continuity of circuit through the links 7 of the chain.

The method by which the present chain is manufactured forms no part of my invention, but it is possible to make it in a machine of the type shown in my Patent No. 1,087,876. In order to form the diaphragm 11, of Fig. 3, it is necessary to subject the strip of insulating material to suitable preliminary treatment in dies to swage up an interrupted rib which, when the strip is rounded into ball form in the forming dies, constitutes the diaphragm referred to. The same effect is produced by the rib 12 of Fig. 4 in which the tubular material from which the ball 13 is shaped is bent in at 14 and the sides of the bend squeezed together to form the rib 12.

I claim as my invention:—

1. As a new article of manufacture, a bead-chain consisting of hollow balls and connecting dumb bell links, at least one series of chain elements being of insulating material, substantially as described.

2. As a new article of manufacture, a bead-chain consisting of hollow balls and connecting dumb bell links, the balls of the chain being of insulating material.

In testimony whereof I have signed my name to this specification, in the presence of two subscribing witnesses.

WILLIAM J. GAGNON.

Witnesses:
 G. W. GOODRIDGE,
 AGNES T. O'BRIEN.